United States Patent
VanRheenen

(10) Patent No.: US 7,557,158 B2
(45) Date of Patent: Jul. 7, 2009

(54) GLOSS REDUCING POLYMER COMPOSITION

(75) Inventor: Paul VanRheenen, Warminster, PA (US)

(73) Assignee: Rohm and Haas Company, Philadelphia, PA (US)

( * ) Notice: Subject to any disclaimer, the term of this patent is extended or adjusted under 35 U.S.C. 154(b) by 217 days.

(21) Appl. No.: 11/206,688

(22) Filed: Aug. 18, 2005

(65) Prior Publication Data

US 2006/0058460 A1  Mar. 16, 2006

Related U.S. Application Data

(60) Provisional application No. 60/610,094, filed on Sep. 15, 2004.

(51) Int. Cl.
*C08L 51/04* (2006.01)
(52) U.S. Cl. .............................. 525/70; 525/71; 525/80; 428/500; 428/518
(58) Field of Classification Search .................. 525/70, 525/71, 80; 428/500, 518
See application file for complete search history.

(56) References Cited

U.S. PATENT DOCUMENTS

| | | | |
|---|---|---|---|
| 4,554,316 A | 11/1985 | Sakano et al. | |
| 4,717,741 A * | 1/1988 | Hahnfeld et al. | 522/116 |
| 4,761,463 A | 8/1988 | Matsumoto et al. | |
| 5,026,777 A | 6/1991 | Jalbert et al. | |
| 5,318,737 A | 6/1994 | Trabert et al. | |
| 5,332,782 A | 7/1994 | Liu et al. | |
| 5,346,954 A | 9/1994 | Wu et al. | |
| 5,369,172 A | 11/1994 | Morgan et al. | |
| 5,395,889 A | 3/1995 | Fujiguchi et al. | |
| 5,430,101 A | 7/1995 | Minematsu et al. | |
| 5,457,156 A | 10/1995 | Liu et al. | |
| 5,576,385 A | 11/1996 | Tiefensee et al. | |
| 5,770,652 A | 6/1998 | Richards et al. | |
| 6,087,449 A | 7/2000 | Tiefensee et al. | |
| 6,380,306 B1 | 4/2002 | Titemann et al. | |
| 6,444,311 B1 | 9/2002 | Friedman et al. | |
| 6,534,592 B1 | 3/2003 | Chou et al. | |
| 2004/0048980 A1 * | 3/2004 | Chang et al. | 525/64 |

FOREIGN PATENT DOCUMENTS

| | | |
|---|---|---|
| DE | 19532047 | 3/1997 |
| EP | 0 11 0 123 B1 | 4/1987 |
| EP | 0259097 | 3/1988 |
| EP | 0473379 | 3/1992 |
| EP | 0711807 | 5/1996 |
| JP | 08-060000 | 3/1996 |
| JP | 08-151502 | 6/1996 |
| WO | WO2005/059029 | 6/2005 |

* cited by examiner

*Primary Examiner*—Jeffrey C Mullis
(74) *Attorney, Agent, or Firm*—Stephen T. Falk

(57) ABSTRACT

Thermoplastic polymer compositions are disclosed that can be processed into capstocks having a reduced gloss appearance, high impact strength and superior weatherability. The capstocks described herein are especially useful for extrusion into articles. They are also useful for application to various poor weathering structural plastic articles for preparing multi-layered composites having improved weatherability. Methods for manufacturing structural plastic capstocks and composites and articles produced therefrom having reduced gloss appearance are also described.

4 Claims, No Drawings

GLOSS REDUCING POLYMER COMPOSITION

CROSS REFERENCE TO RELATED PATENT APPLICATIONS

This is a non-provisional patent application of U.S. provisional patent application Ser. No. 60/610,094 filed Sep. 15, 2004.

BACKGROUND

This invention relates to polymer compositions for reducing gloss, which can be used in thermoplastic formulations, including capstock formulations, as well as in other applications. These compositions are especially useful for extruding into articles and for application to structural plastics such as poly(vinyl chloride) and acrylonitrile-butadiene-styrene (ABS), to prepare composites exhibiting low gloss. The invention also extends to composite articles exhibiting low gloss.

Poly(vinyl chloride) resin (hereafter "PVC") has a combination of properties which make it particularly suitable for use as a structural material. In applications in which impact strength of the structural plastic is important, the PVC can be formulated with impact-modifier resins which improve the impact strength of the resulting composition. Such high impact-strength PVC compositions can be readily extruded or otherwise formed into a variety of articles which have excellent impact strength, toughness and other desired mechanical and chemical properties; for example as siding for buildings, shutters, technical profiles for window and door frames, rain carrying systems (e.g., gutters and downspouts), and fencings.

Such PVC compositions, however, have relatively poor weatherability characteristics, particularly poor color retention in darker grade colors such as browns and blues. The color is imparted to the PVC composition, for instance, by the use of colorants such as pigments or dyes, but exposure to sunlight causes unappealing changes in the colors. Such unappealing changes are more severe for darker than for light colors. Poor weatherability characteristics also causes reduction in impact strength leading to embrittlement and cracking and/or mechanical failure of the articles prepared from such compositions. Typically, another resinous material is applied over the PVC to provide a surface that can withstand sunlight and other environmental conditions. Such a surfacing material is called "capstock." The capstock generally is much thinner than the substrate plastic, typically being about 10% to about 25% of the total thickness of the composite (i.e. the capstock and substrate plastic).

A suitable capstock material must possess a certain combination of processing properties and other physical, chemical, and aesthetic properties, including exceptional weathering characteristics such as excellent color retention and high impact strength. Moreover, the capstock also must not affect adversely those properties which make PVC such a widely used building material. In particular, the capstock compositions that are particularly aesthetically desirable do not have a shiny appearance but rather have a flat, or reduced gloss appearance.

Various types of polymer-based compositions have been disclosed for use as capstock, including PVC-based compositions and acrylic resin based compositions. A number of these polymer-based compositions are described in European Patent Application EP-A-473,379 which is incorporated herein by reference for its teaching of capstock compositions and substrates. U.S. Pat. No. 6,534,592 (EP1061100) teaches a blend of acrylic-based core/shell polymers, including in combination with flatting or matting agents and UV stabilizers. U.S. Pat. No. 5,346,954 (EP269324) teaches matting agents comprising polymeric materials that are large in particle size, typically 2 to 15 microns. These materials are typically made of cross-linked rubber polymer particles so that they remain as individual particles during melt processing.

JP996060000A teaches cross-linked thermoplastic polymer compositions with good delustering and light scattering properties. The blends comprise thermoplastic polymers, active hydrogen-containing copolymers and compounds containing at least two glycidyl groups, where the thermoplastic polymer can be a methacrylate resin, styrene resin, vinyl chloride resin, AS resin, MS resin or ABS resin.

What is needed is an improved capstock material having a high impact strength, adequate color retention, reduced gloss properties and good processing capabilities.

The present invention provides a thermoplastic composition exhibiting reduced gloss, comprising: (a) a thermoplastic polymer comprising (i) from 50 to 100 parts by weight of a first medium rubber core/shell polymer; and (ii) from 0 to 50 parts by weight of a second high rubber core/shell polymer, wherein the shell polymer has a molecular weight in the range of from 25,000 to 350,000 g/mol; and (b) at least one percent (1%) by weight of a curable gloss reducing acrylic polymer. The present invention further provides a synthetic composite comprising: (a) an extrudable thermoplastic substrate layer and (b) an extrudable thermoplastic capstock layer disposed thereon comprising (i) a thermoplastic polymer comprising (A) from 50 to 100 parts by weight of a first medium rubber core/shell polymer; and (B) from 0 to 50 parts by weight of a second high rubber core/shell polymer, wherein the shell polymer has a molecular weight in the range of from 25,000 to 350,000 g/mol; and (ii) at least one percent (1%) by weight of a curable gloss reducing acrylic polymer.

Surprisingly, the addition of a curable gloss reducing acrylic polymer, either self-curing or in combination with a curing agent, and an acrylic-based core/shell polymer, to a thermoplastic polymer, such as a capstock base polymer, provides gloss reduction with improved processing conditions. The term "acrylic" means that the polymer contains copolymerized units deriving from (meth)acrylic monomers such as, for example, (meth)acrylate esters, (meth)acrylamides, (meth)acrylonitrile, and (meth)acrylic acid. Use of the term "(meth)" followed by another term such as, for example, acrylate or acrylamide, as used throughout the disclosure, refers to both acrylates or acrylamides and methacrylates and methacrylamides, respectively. To be considered an acrylic polymer or acrylic-based core/shell polymer, the acrylic content must be greater than 50 weight percent based on the polymer.

The term "reduced gloss" refers to a surface having an average gloss value of 60 or less as measured with a 75 degree incident angle geometry gloss meter. The term "molecular weight" used herein refers to the weight average molecular weight of polymer molecules as determined by the gel permeation chromatography method with polystyrene standards. The term "crosslinker" used herein refers to multi-functional monomers capable of forming multiple covalent bonds between polymer molecules of the same type. The term "parts" used herein is intended to mean "parts by weight". Unless otherwise stated, "total parts by weight" do not necessarily add to 100. The term "weight percent" used herein is intended to mean "parts per hundred" wherein the total parts add to 100.

Thermoplastic polymers may be any homopolymer or copolymer that is rendered soft and moldable by heat. Such polymers may be made by emulsion, bulk, suspension or solution polymerization. Thermoplastic polymers are particularly useful as a capstock base polymer. Suitable capstock base polymer may be any combination of a number of well known polymer-based compositions used as capstock, including PVC-based compositions and acrylic resin based compositions, with or without multi-layered or core/shell particles. A number of these polymer-based compositions are described in European Patent Application EP-A473,379 which is incorporated herein by reference for its teaching of capstock compositions and substrates. Preferred capstock base polymers comprise an aqueous emulsion homopolymer or copolymer derived from polymerizing at least one ethylenically unsaturated monomer. More preferred capstock base polymers comprise a blend of acrylic-based core/shell polymers.

The capstock base polymer of the present invention comprises one or more of a first "medium rubber" acrylic-based core/shell polymer with or without a second "high rubber" acrylic-based core/shell polymer; having from 50 to 100, preferably from 75 to 95, and most preferably 75 to 85 parts by weight of a first "medium rubber" core/shell polymer and from 0 to 50 parts, preferably from 5 to 30, and most preferably 15 to 25 parts by weight of a second "high rubber" core/shell polymer. The capstock base polymer may have other or additional stages, which are polymerized after the formation of the rubbery core stage. The first "medium rubber" core/shell polymers of the present invention can contain from 30 to 70, preferably from 35 to 60, and most preferably from 35 to 45 parts by weight of a rubbery core polymer and from 30 to 70, preferably 40 to 65, most preferably 55 to 65 parts by weight of a shell polymer grafted to the core polymer.

Such rubbery core polymers can contain from 45 to 99.9, preferably from 80 to 99.5, and most preferably from 94 to 99.5 parts by weight of units derived from at least one C1-C8 alkyl acrylate monomer, from 0 to 35, preferably from 0 to 20, most preferably from 0 to 4.5 parts by weight of units derived from at least one ethylenically unsaturated copolymerizable monomer different from the at least one C1-C8 alkyl acrylate monomer, and from 0.1 to 5, preferably from 0.5 to 2, most preferably from 0.5 to 1.5 parts by weight of units derived from at least one crosslinker or graftlinker.

As long as the core polymer remains rubbery, the core polymer may also contain additional units derived from at least one ethylenically unsaturated copolymerizable monomer different from the C1-C8 alkyl acrylate monomers such as C1-C8 alkyl methacrylates, vinyl aromatic monomers, vinyl-unsaturated carboxylic acids monomers, and nitrogen-containing vinyl unsaturated monomers.

The shell polymer grafted to the core polymer of the first "medium rubber" core/shell polymers of the preferred capstock base polymer contains from 80 to 99, preferably from 85 to 97, and most preferably from 92 to 96 parts by weight of units derived from at least one C1-C8 alkyl methacrylate monomer, and from 1 to 20, preferably from 10 to 20 parts by weight of units derived from at least one ethylenically unsaturated copolymerizable monomer different from the at least one C1-C8 alkyl methacrylate monomer.

Suitable polymers for the outer shell of the first core/shell polymer require that they have a glass transition temperature ("Tg") above 20° C. and therefore may also contain one or more units derived from ethylenically unsaturated copolymerizable monomers which are different from the at least one C1-C8 alkyl methacrylate monomer.

The shell molecular weights of the shell polymer are in the range of from 10,000 to 1,000,000 and preferably in the range of from 50,000 to 500,000 g/mol. Controlling molecular weights in this range can be accomplished by one of various methods known in the art and is preferably accomplished by preparing the outer shell polymers in the presence of one or more chain transfer agents. Increasing the chain transfer agent amount lowers the shell molecular weight. The amount of chain transfer agent present can be in the range of from 0 to 5, and preferably from 0.001 to 1.0, weight percent based on shell polymer weight.

The second "high rubber" core/shell polymers of the preferred capstock base polymer contains from 70 to 92, preferably from 72 to 88, and most preferably from 75 to 85 parts by weight of a rubbery core polymer and from 8 to 30, preferably from 12 to 28, and most preferably from 15 to 25 parts by weight of a shell polymer grafted to the core polymer.

Such rubbery core polymers contain from 50 to 99.9, preferably from 80 to 99.9, and most preferably from 90 to 99.9 parts by weight of units derived from at least one C1-C8 alkyl acrylate monomer, from 0 to 45, preferably from 0 to 15, and most preferably from 0 to 5 parts by weight of units derived from at least one ethylenically unsaturated copolymerizable monomer different from the at least one C1-C8 alkyl acrylate monomer, and from 0.1 to 5, preferably from 0.5 to 2, most preferably from 0.7 to 1.5 parts by weight of units derived from at least one crosslinker and graftlinker. It is preferred that the rubbery core polymers contain from 0.0001 to 0.1 parts by weight total of units derived from at least one crosslinker and at least one graftlinker.

As long as the core polymer remains rubbery, the core polymer of the second "high rubber" core/shell polymer may also contain additional units derived from at least one copolymerizable monomers such as C1-C8 alkyl (meth)acrylate, vinyl aromatic monomers such as styrene, vinyl-unsaturated carboxylic acids monomers such as methacrylic acid, and nitrogen-containing vinyl unsaturated monomers such as acrylonitrile. The C1-C8 alkyl (meth)acrylates are the preferred additional monomers in view of their superior weatherability.

The shell polymer grafted to the core polymer of the second "high rubber" core/shell polymers of the preferred capstock base polymer contains from 50 to 100, preferably from 90 to 100, and most preferably from 98 to 99.9 parts by weight of units derived from at least one C1-C8 alkyl methacrylate monomer. The shell molecular weight is in the range of from 10,000 to 1,000,000, preferably in the range of from 50,000 to 200,000, and most preferably in the range of from 80,000 to 150,000 g/mol. If the shell molecular weight is too low then the degree of grafting is considerably reduced.

Shell molecular weights can be controlled by various methods known in the art, the most preferred method is to use a chain transfer agent in the amounts of from 0.005 to 5.0, preferably from 0.05 to 2.0, and most preferably from 0.1 to 2.0 weight percent based on shell polymer weight during the shell polymerization. A chain transfer agent may be used to control the molecular weight of the shell polymer and is important for providing capstock compositions that are able to be processed. If less than 0.005 weight percent chain transfer agent is used then the shell molecular weight becomes too high and the viscosity increases, thereby resulting in greater energy needed for processing. If the chain transfer agent amount is greater than 5.0 weight percent then the degree of grafting of shell polymer becomes too low resulting in degraded performance.

Suitable polymers for the outer shell of the second core/shell polymer require that they have a glass transition temperature ("Tg") above 20° C. and therefore may also contain one or more units derived from ethylenically unsaturated copolymerizable monomers which are different from the at least one C1-C8 alkyl methacrylate monomer.

One or more chain transfer agents can be used to control the molecular weight of the shell polymer of the second "high rubber" core/shell polymer. Common chain transfer agents or mixtures thereof known in the art include the C4-C18 alkyl mercaptans, mercapto-group-containing acids, thiophenols, carbon tetrabromide, carbon tetrachloride, and the like. They may be used alone or as mixtures thereof.

A curable gloss reducing acrylic polymer is blended with the thermoplastic polymer at levels of at least one percent (1%) by weight and preferably at levels of at least five percent (5%) by weight. In formulating a capstock, the blending can be done by blending the capstock base polymer and the curable gloss reducing acrylic polymer before isolation to powder by spray drying, freeze drying, or coagulation and drying. If the curable gloss reducing acrylic polymer can be isolated by itself it can also be dry blended with a powder of the capstock base polymer.

The curable gloss reducing acrylic polymer comprises, as polymerized units, functional groups capable of being crosslinked or cured. These functional groups are incorporated into the gloss reducing acrylic polymer by the use of ethylenically unsaturated, polymerizable monomers. Levels of 1 to 15% by weight of these functional monomers in the gloss reducing acrylic polymer are most effective.

The functional groups may be capable of self curing by the simple addition of heat and/or catalyst, such as with methylol or silanol functionality, including one or more monomers selected from the group consisting of (mono, di, tri alkoxysilyl) alkyl (meth)acrylate; and methylol acrylamide, methylol methacrylamide, methyl acrylamidoglycolate methyl ether, acrylamidoglycolic acid.

The functional groups may also be of the type that are reactive with an added curing or crosslinking agent. The curing agent should be added at levels sufficient to crosslink with the gloss reducing acrylic polymer which has reactive functionality, preferably at levels of 0.1 to 10 weight percent curing agent on gloss reducing acrylic polymer. Examples of these functional groups are carboxylic acid, anhydrides, hydroxyl, amine, isocyanate, active methylene (1,3-diketo, cyano acetate, malonate, etc.), and epoxy groups. Examples of monomers with these functional groups are: acrylic acid, methacrylic acid, maleic acid, crotonic acid, itaconic acid, monomethyl itaconate, monomethyl fumarate, monobutyl fumarate, maleic anhydride, itaconic anhydride, dimethyl amino ethyl (meth)acrylic, dimethyl amino propylmethacrylamide, vinyl pyridine, t-butylaminoethyl methacrylate, hydroxyl propyl (meth)acrylate, hydroxyl ethyl (meth)acrylate, acetoacetoxyethyl (meth)acrylate (AAEM), glycidyl (meth)acrylate, allyl glycidyl ether, vinyl isocyanate, and allyl isocyanate.

Particularly desired are carboxylic acid functional groups. Suitable curing agents for carboxylic acid functional, gloss reducing polymers are: polyfunctional amines; polyfunctional epoxides; polyfunctional carbodiimides; polyols; polyisocyantes; activated polyamides (Primid™ 552 from EMS), melamine-formaldehyde resins, urea-formaldehyde; and polyaziridines where polyfunctional means having two or more reactive groups.

Suitable curing agents for anhydride functional, gloss reducing polymers are: polyfunctional amines; polyfunctional epoxides; polyols; and polyisocyantes.

Suitable curing agents for hydroxyl functional, gloss reducing polymers are: polyfunctional epoxides; polyisocyantes; polyanhydrides; and melamine-formaldehyde resins and urea-formaldehyde resins.

Suitable curing agents for amine functional, gloss reducing polymers are: polyfunctional carboxylic acids; polyfunctional epoxides; polyisocyantes; and melamine-formaldehyde resins and urea-formaldehyde resins where polyfunctional means having two or more reactive groups.

Suitable curing agents for active methylene, gloss reducing polymers are: polyfunctional aldehydes; polyamines; polyacrylates by Michael reaction; and melamine-formaldehyde resins and urea-formaldehyde resins.

Suitable curing agents for epoxy functional, gloss reducing polymers are: polyfunctional amines; polyols; polyfunctional carboxylic acids; polyandhydrides; melamine-formaldehyde resins, urea-formaldehyde etc. where polyfunctional means having two or more reactive groups.

Suitable curing agents for isocynate functional, gloss reducing polymers are polyfunctional amines, polyols, polyfunctional carboxylic acids, and polyfunctional anhydrides; where polyfunctional means having two or more reactive groups.

The curable gloss reducing acrylic polymer can comprise an emulsion polymer, a suspension polymer, a bulk polymerized polymer, a solution polymerized polymer or any combination of the foregoing. Preferably it is an aqueous emulsion polymer. The term "emulsion polymer" means an emulsion polymerized addition polymer.

Ethylenically unsaturated monomers include, for example, (meth)acrylic ester monomer including methyl (meth)acrylate, ethyl (meth)acrylate, butyl (meth)acrylate, 2-ethylhexyl (meth)acrylate, decyl (meth)acrylate, lauryl (meth)acrylate, stearyl (meth)acrylate, hydroxyethyl (meth)acrylate, hydroxypropyl (meth)acrylate, aminoalkyl (meth)acrylate, N-alkyl aminoalkyl (meth)acrylate, N,N-dialkyl aminoalkyl (meth) acrylate, N-alkyl aminoalkyl (metha)crylamide, N,N-dialkyl aminoalkyl (metha)crylamide, vinyl pyridine, N-alkoxyethyl (meth)acrylate; urieido (meth)acrylate; (meth)acrylonitrile; (meth)acrylamide; styrene or alkyl-substituted styrenes; butadiene; ethylene; vinyl ester monomer such as, for example, vinyl acetate, vinyl propionate, vinyl butyrate, vinyl 2-ethyl hexanoate, vinyl laurate, vinyl pivalate, 1-methylvinyl acetate, and vinyl esters of branched carboxylic acids having 5-12 carbon atoms (as vinyl versatate); vinyl chloride, vinylidene chloride, and N-vinyl pyrollidone; allyl (meth) acrylate, diallyl phthalate, ethylene glycol di(meth)acrylate, 1,3-butylene glycol di(meth)acrylate, 1,6-hexanediol di(meth)acrylate, and divinyl benzene; (meth)acrylic acid, crotonic acid, itaconic acid, vinyl sulfonic acid, 2-acrylamidopropane sulfonate, sulfoethyl methacrylate, phosphoethyl methacrylate, fumaric acid, maleic acid, monomethyl itaconate, monomethyl fumarate, monobutyl fumarate, maleic anhydride, itaconic anhydride, trimethoxylsilane propylmethacrylate, glycidyl (meth)acrylate, allyl glycidyl ether, vinyl isocyanate, and allyl isocyanate.

The glass transition temperature ("Tg") of the emulsion polymer is from −80° C. to 150° C. "Glass transition temperature" or "$T_g$" as used herein, means the temperature at or above which a glassy polymer will undergo segmental motion of the polymer chain. Glass transition temperatures of a polymer can be estimated by the Fox equation [Bulletin of the American Physical Society 1, 3, page 123 (1956)] as follows:

$$\frac{1}{T_g} = \frac{w_1}{T_{g(1)}} + \frac{w_2}{T_{g(2)}}$$

For a polymer of monomers $M_1$ and $M_2$, $w_1$ and $w_2$ refer to the weight fraction of the two monomers, and $T_{g(1)}$ and $T_{g(2)}$ refer to the glass transition temperatures of the two corresponding homopolymers in degrees Kelvin. For polymers containing three or more monomers, additional terms are added ($w_n$/$T_{g(n)}$). The $T_g$ of a polymer can also be measured by various techniques including, for examples, differential scanning calorimetry ("DSC"). The particular values of $T_g$ reported herein are measured based on DSC where the scan rate is 10° C./min. The glass transition temperatures of homopolymers may be found, for example, in "Polymer Handbook", edited by J. Brandrup and E. H. Immergut, Interscience Publishers.

The polymerization techniques used to prepare aqueous emulsion-copolymers are well known in the art. In the emulsion polymerization process conventional surfactants may be used such as, for example, anionic and/or nonionic emulsifiers, as well as conventional chain transfer agents. The amount of surfactant used is usually 0.1% to 6% by weight, based on the weight of monomer. Either thermal or redox initiation processes may be used.

The emulsion polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometric patterns such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. In the case of a multi-staged polymer particle the $T_g$ for the purpose of this invention is to be calculated by the Fox equation as detailed herein using the overall composition of the emulsion polymer without regard for the number of stages or phases therein. Similarly, for a multi-staged polymer particle the amount of acid monomer shall be determined from the overall composition of the emulsion polymer without regard for the number of stages or phases therein. The polymerization techniques used to prepare such multistage emulsion polymers are well known in the art such as, for example, U.S. Pat. Nos. 4,325,856; 4,654, 397; and 4,814,373. The average particle diameter of the emulsion copolymer particles is preferred to be from 30 nanometers to 500 nanometers, as measured by a BI-90 Particle Sizer. More preferred is an average particle diameter in the range of 50-250 nanometers.

The blended composition comprising a curable gloss reducing acrylic polymer and a thermoplastic polymer comprising an acrylic-based core/shell polymer, may further contain from 0 to 5, preferably from 0.5 to 3, most preferably from 1 to 2 parts by weight of at least one UV light stabilizer. Many suitable UV light stabilizers are described in "*Plastics Additives and Modifiers Handbook, Ch. 16 Environmental Protective Agents*", J. Edenbaum, Ed., Van Nostrand (1992) pp. 208-271, which is incorporated herein by reference for its disclosure of UV light stabilizers. Preferred UV light stabilizers are of the HALS-, benzotriazole-, and benzophenone-type compounds. These compounds further enhance the weatherability of a capstock composition. Many such compounds are commercially available from Ciba Specialty Chemicals (Tarrytown, N.Y.) under the TINUVIN trade name.

The blended composition comprising a curable gloss reducing acrylic polymer and a thermoplastic polymer comprising an acrylic-based core/shell polymer, may further contain from 0 to 100 parts by weight of at least one polyvinyl chloride resin ("PVC"). Because total parts by weight in a capstock composition do not necessarily add to 100, the addition of a maximum of 100 parts by weight PVC to the capstock composition results in a weight ratio of PVC to first and second core/shell polymers of 100:100, or about 50 weight percent. The addition of other components follows this weight fraction protocol. Although the addition of PVC has a tendency to reduce the gloss of the capstock, it also has the effect of reducing the ability of the capstock to withstand weathering.

The blended composition comprising a curable gloss reducing acrylic polymer and a thermoplastic polymer comprising an acrylic-based core/shell polymer, may further contain from 0 to 30 parts by weight of at least one pigment or filler. Many suitable pigments are described in "Plastics Additives and Modifiers Handbook, Section VIII, "Colorants", J. Edenbaum, Ed., Van Nostrand (1992), pp. 884-954 which is incorporated herein by reference for its disclosure of various pigments useful for coloring plastics. Examples include organic pigments and inorganic pigments, and those preferred are resistant to UV and visible light exposure such as titanium dioxide (white), clays (beige) and slate blue pigment (blue).

The blended composition comprising a curable gloss reducing acrylic polymer and a thermoplastic polymer comprising an acrylic-based core/shell polymer, may further contain from 0 to 5 parts by weight of a powder flow aid. Suitable powder flow aids may be incorporated in the spray drying process used for recovering dry powder capstock composition. An example is stearic acid-coated calcium carbonate. Flow aids are further described in U.S. Pat. No. 4,278,576 which is incorporated by reference for its disclosure of flow aids useful for spray drying emulsions of core/shell polymers.

Any known processing technique may be employed in co-extruding a blended composition of the present invention onto a substrate. The blended composition is prepared by mixing a curable gloss reducing acrylic polymer and a thermoplastic polymer comprising an acrylic-based core/shell polymer. Additional components in the resin composition, such as UV stabilizers, thermal stabilizers, pigments, optical brighteners, PVC resin, matting agents, flow aids, processing aids, lubricants, fillers, and the like, may be blended in either powder or liquid form, typically from 0 to 35 parts by weight. Some examples of additional components include lubricants such as aliphatic lubricants and waxes, fluoropolymers and silicones; thermal stabilizers such as Irgofos from Ciba Specialty Chemicals (Tarrytown, N.Y., USA); and processing aids such as Paraloid™ K120 from Rohm and Haas Company (Philadelphia, Pa., USA). If a pelletized form of a blended composition is preferred for preparing capstock film, sheet, and other various articles instead of a powder (e.g., to avoid dust), then the powder may be formed into pellets using any suitable plastics pelletization equipment and methods known in the plastics processing art. This can be especially useful in combination with the mixing step wherein the components of the resin composition can be compounded (mixed) and pelletized using standard plastics processing equipment.

The mixture is fed into a plastics processing device, such as an extruder, which is well known to the plastics-processing art. Typically, an extruder having a feed section and a metering section is utilized. Further details can be found in *Principles of Polymer Processing*, by Z. Tadmor and C. G. Gogos, John Wiley, 1979.

Forming the melt into a melt layer in a die located at the end of the extruder is done within a suitable plastics forming device, such as a die, as is known in the art, including multi-manifold dies and feed block dies. For preparing capstock it is best to form the melt into a thickness of from 0.1 to 1.0 mm thick, which is useful as protective layers for PVC building products (e.g., PVC siding, window frames, fencing, decking, and rain gutters).

The extruded melt layer is then cooled in accordance with known plastics processing steps, including by passing the melt layer through a cooling fluid medium such as a liquid (i.e., water) or a gas (i.e., air) having a temperature sufficiently low to cause the capstock to harden. The temperature of the cooling fluid should be kept below the hardening temperature, i.e. Tg, of the polymeric component having the highest Tg in the composition. As an example, capstock compositions including core/shell polymers having PMMA shells of a Tg of about 100° C. and require a cooling fluid, i.e., water, having a temperature of about 80° C. or less.

Alternatively from, or in addition to using a cooling fluid, the melt layer can be passed and/or pressed between chilled rollers which may be polished smooth and/or have an embossing pattern. It is particularly preferable for capstock used for PVC siding applications to have rollers that provides an embossing pattern that produces a wood-grain effect into the capstock. Other embossing patterns are also envisioned for the chiller rollers, such as a matte finish. Such wood grain effect and matte-finish embossing patterns also tend to further reduce the gloss of the capstock and are therefore particularly desirable for use in the cooling step of preparing reduced-gloss weatherable impact-resistant capstock.

A method for making a synthetic resin composite is also envisioned which involves extruding a plurality of thermoplastic extrusion compounds and applying them together in a particular fashion. At least one of the thermoplastic extrusion compounds will be a capstock composition and disposed upon at least one other thermoplastic extrusion compound functioning as at least one substrate layer. It is also envisioned that the capstock composition can be extruded in multiple layers to allow for additional protection on one or more sides of the composite.

A typical capstock can be from 0.1 to 1.0 mm thick, whereas the structural plastic can be about 0.8 to 1.2 mm thick for PVC siding applications, and from 1.2 to 3.0 mm for PVC profile applications (e.g., PVC window frames, fencing, decking, and rain gutters). If the capstock and substrate are too thick then the articles made therefrom will suffer too great cost, whereas if they are too thin then they will be lacking in strength.

The substrate layer may also be formed by an extrusion of a thermoplastic resin. The thermoplastic resin may be any of the extrudable thermoplastic resins known in the art, examples of which are described in U.S. Pat. No. 5,318,737, incorporated herein by reference for its disclosure of extrudable resins and extrusion processes.

Preferred extrudable thermoplastic resins which are especially useful for making building products, but which require protection from a capstock layer against weathering and physical impacts, include PVC, chlorinated polyvinylchloride ("CPVC"), high impact polystyrene ("HIPS"), polypropylene ("PP") and acrylonitrile-butadiene-styrene ("ABS"). It is also preferred that the extrudable thermoplastic resins of the capstock and substrate layers adhere to one another to prevent delamination of the composite. Adhesion can be promoted through selection of resins which are compatible and/or miscible with one another (e.g., polymethyl methacrlyate-based resins and chlorinated resins). Various methods known in the art, such as surface treatment with adhesion promoters (i.e., corona discharge) and/or application of an adhesive, are envisioned for improving the adhesion between the substrate and capstock layers of the composite.

Synthetic resin composites can have a substrate layer of an extrudable thermoplastic resin, and a capstock layer. The composites can be formed for example, by laminating pre-formed sheets or films of PVC structural plastic and the capstock together by thermal fusion or by adhesive.

Preferred extrudable thermoplastic resins used as the substrate layer include PVC, CPVC, HIPS, PP and ABS. Preferably, the capstock layer has an average gloss measured at a 75 degree incident angle geometry of less-than 60, preferably less than 50, and most preferably below 35. Also, the capstock layer is preferred to have a drop dart impact strength of greater than 25 in-lbs per 40 mils of thickness at 23° C. according to D4226. It is also preferred that the capstock layer has a ΔE value of 2.0 or less after 3000 hours of accelerated weathering according to ASTM D4329 Cycle C.

EXAMPLES

In the following Examples, core-shell polymers are prepared using a free-radical polymerization process in an appropriate kettle equipped with a stirrer, means for controlling the reactor temperature, means for dropping the formed polymer emulsion to a container, means for recording temperature, means for adding emulsifier solution, means for adding initiator, and means for adding monomers. Particle size of the emulsion particles is measured using a Nanosizer BI-90 (Brookhaven Instruments, Holtsville, N.Y.).

Polymer powders are prepared according to the spray-drying process described in U.S. Pat. No. 4,278,576; from 0 to 3% by weight of a calcium carbonate flow aid is optionally added to the emulsion during spray drying. Powder particle sizes are measured using a Coulter Laser Particle Size Analyzer, Model LS-130 instrument (Beckman Coulter, Inc., Fullerton, Calif.).

Dry powders are mixed to form dry powder mixtures without melting using a high intensity mixer. This material is processed in a Haake twin screw (TW100) extruder at 80 rpms with the zones and 50 mm ribbon die set at specified temperatures. Films are extruded at about 40 mils in thickness. Average gloss values are measured using a 75 degree incident angle geometry glossmeter (BYK-Gardner USA, Chicago, Ill.). Drop dart impact is measured at 23° C. according to ASTM D4226.

The following abbreviations are employed in the examples:
AA=Acrylic Acid
ALMA=allyl methacrylate
BA=butyl acrylate
MMA=methyl methacrylate
pMMA=poly(methyl methacrylate)

The following examples are illustrative of the invention.

Example 1

Core/Shell Capstock Base Polymer Without a Curable Gloss Reducing Acrylic Polymer This example provides a core/shell polymer of 40% (99 BA/1 ALMA ) first stage and 60% (80 MMA/20 BA) second stage where the second stage is graft-linked to the first stage.

The first stage monomer emulsion is prepared by blending 673.20 grams of butyl acrylate, 6.80 grams of allyl methacrylate, 36.78 grams of sodium dodecylbenzenesulfonate (10% in water), and 340 grams of deionized water. A reactor containing 810 grams deionized water and 0.47 grams acetic acid is heated to 57° C. while its contents are sparged with nitrogen for 30 minutes. Next 11.05 grams of a 6% water solution of sodium formaldehyde sulfoxylate is charged to the reactor and rinsed with 10 grams of water. Next is charged 48.81 grams of a polymer emulsion latex (33.47% by weight, 40 nm particle size) consisting of polyethyl acrylate-co-methyl methacrylate (50/50) followed by a rinse of 20 grams of water. The initially prepared monomer emulsion and 13.26 grams of 5% t-butyl hydroperoxide initiator are then separately fed into the reactor over 45 minutes. The polymerization reaction reaches a peak temperature, which is then adjusted to 78° C. at the end of the monomer and initiator feeds. The particle size at the end of the first stage is 145 to 155 nm.

The second stage monomer emulsion is prepared by blending 816 grams of methyl methacrylate, 204 grams of butyl acrylate, 0.5 grams of sodium carbonate, 40.95 grams of 10% sodium dodecylbenzenesulfonate and 660 grams of deionized water. After stage one is complete, 46.4 grams of 6% sodium formaldehyde sulfoxylate is added to the reactor with 10 grams of rinse water. This addition is followed by a gradual feed of the second monomer emulsion and a co-feed of 27.85 grams of 5% t-butyl hydroperoxide initiator over 90 minutes. The reaction is maintained at 85° C. and held at this temperature for an additional 30 minutes after feeds. The reaction mixture is subsequently cooled. The total solids weight fraction is 45-46%, the final particle size at the end of the second stage is 180-200 nm, and the pH is 5.0.

A polymer powder is prepared according to the spray-drying process described in U.S. Pat. No. 4,278,578 and from 0 to 3% by weight of calcium carbonate flow aid is optionally added to the emulsion during spray drying. Optionally, the polymer can be isolated by freeze drying, or coagulation with salts followed by drying, or by a de-volatilizing extruder.

Example 2

Core/Shell Capstock Base Polymer With an Acid Functional Acrylic Polymer and No Curing Agent In example 2, 100 parts capstock base polymer of example 1 is blended with 15 parts of an acid functional acrylic polymer Elastene™ A-10, available from Rohm and Haas Company. This is done by mixing 1000 grams of the emulsion polymer of example 1 (45.5% solids) with 110.1 grams of Elastene™ A-10 emulsion polymer (62% solids) with good stirring. A polymer powder is prepared from this mix according to the spray-drying process described in U.S. Pat. No. 4,278,578 and from 0 to 3% by weight of calcium carbonate flow aid is optionally added to the emulsion during spray drying.

Example 3

Core/Shell Capstock Base Polymer With a Curable Gloss Reducing Acrylic Polymer 999.65 grams of powder from example 2 are mixed in a Waring blender with 0.35 grams of Jeffamine™ D400, a diamine of molecular weight 400 and a backbone of polypropylene oxide, available from Huntsman Corporation of Houston, Tex. This gives a blend with 0.035% Jeffamine™ D-400 on total weight or 0.268% on Elastene™ A-10 weight.

Example 4

Core/Shell Capstock Base Polymer With a Curable Gloss Reducing Acrylic Polymer 999 grams of powder from example 2 are mixed in a Waring blender with 1 grams of Jeffamine™ D400, a diamine of molecular weight 400 and a backbone of polypropylene oxide, available from Huntsman Corporation of Houston, Tex. This gives a blend with 0.1% Jeffamine™ D400 on total weight or 0.77% on Elastene™ A-10 weight.

Example 5

Core/Shell Capstock Base Polymer With a Curable Gloss Reducing Acrylic Polymer 998 grams of powder from example 2 are mixed in a Waring blender with 2 grams of Jeffamine™ D-400, a diamine of molecular weight 400 and a backbone of polypropylene oxide, available from Huntsman Corporation of Houston, Tex. This gives a blend with 0.2% Jeffamine™ D400 on total weight or 1.54% on Elastene™ A-10 weight.

Example 6

Core/Shell Capstock Base Polymer With a Curable Gloss Reducing Acrylic Polymer 999.65 grams of powder from example 2 are mixed in a Waring blender with 0.35 grams of D.E.R.™ 736 epoxy resin, a diepoxy with molecular weight of 368 and a backbone of polypropylene oxide, available from Dow Chemical, Midland, Mich. This gives a blend with 0.035% D.E.R.™ 736 on total weight or 0.268% on Elastene™ A-10 weight.

Example 7

Core/Shell Capstock Base Polymer With a Curable Gloss Reducing Acrylic Polymer 999 grams of powder from example 2 are mixed in a Waring blender with 1 grams of D.E.R.™ 736 epoxy resin, a diepoxy with molecular weight of 368 and a backbone of polypropylene oxide, available from Dow Chemical, Midland, Mich. This gives a blend with 0.1% D.E.R.™ 736 on total weight or 0.77% on Elastene™ A-10 weight.

Example 8

Core/Shell Capstock Base Polymer With a Curable Gloss Reducing Acrylic Polymer 998 grams of powder from example 2 are mixed in a Waring blender with 2 grams of D.E.R.™ 736 epoxy resin, a diepoxy with molecular weight of 368 and a backbone of polypropylene oxide, available from Dow Chemical, Midland, Mich. This gives a blend with 0.2% D.E.R.™ 736 on total weight or 1.54% on Elastene™ A-10 weight.

TABLE 1

| Example | Description | 75° Gloss | Drop Dart Impact In-lb/40 mil |
|---|---|---|---|
| 1 | Core/Shell Polymer No Curable Gloss Reducing Acrylic Polymer | 60.1 | 40 |
| 2 | Example 1 plus Acid Functional Polymer (No curing agent) | 35 | 52 |
| 3 | Example 2 plus 0.268% Jeffamine ™ D-400 | 29 | 50 |
| 4 | Example 2 plus 0.77% Jeffamine ™ D-400 | 23.5 | 48 |
| 5 | Example 2 plus 1.54% Jeffamine ™ D-400 | 22.7 | 50 |
| 6 | Example 2 plus 0.268% D.E.R. ™ 736 | 18.7 | 50 |
| 7 | Example 2 plus 0.77% D.E.R. ™ 736 | 17.1 | 50 |
| 8 | Example 2 plus 1.54% D.E.R. ™ 736 | 13.9 | 57 |

Films were extruded on a Haake twin screw (TW100) extruder at 80 rpms using a 50 mm ribbon die. Zones were set at z1=150° C., z2=160° C., z3=160° C., die=177° C. Films were extruded at about 40 mils in thickness.

Example 9

Non-Core/Shell Capstock Base Polymer Without a Curable Gloss Reducing Acrylic Polymer This example is Plexiglas™ VS100 from Atofina. The material is a thermoplastic copolymer of methyl methacrylate with a Tg of about 95° C.

Example 10

Non-Core/Shell Capstock Base Polymer With a Curable Gloss Reducing Acrylic Polymer 100 parts by weight of Plexiglas™ VS100 from Atofina is blended with 15 parts by weight of acid functional acrylic polymer Rhoplex™ HG1630, available from Rohm and Haas Company. The Rhoplex™ HG1630 is used as spray dried powder. To this is blended 0.6 parts of D.E.R.™ 736 epoxy resin.

Example 11

Core/Shell Capstock Base Polymer With a Curable Gloss Reducing Acrylic Polymer 100 parts of capstock base polymer of example 1 is blended with 15 parts by weight of acid functional acrylic polymer Rhoplex™ HG1630. To this is blended 0.6 parts of D.E.R.™ 736 epoxy resin.

Films were extruded on a Haake twin screw (TW100) extruder at 80 rpms using a 50 mm ribbon die as before for the above three examples. Zones were set at z1=165° C., z2=170° C., z3=175° C., die=175° C. Films were extruded at about 40 mils in thickness. Results are shown in Table 2.

TABLE 2

Blends of Rhoplex ™ HG1630 Acid Functional Acrylic Polymer with Polymers

| Example | Description | 75° Gloss | Drop Dart Impact In-lb/40 mil |
|---|---|---|---|
| 9 | Non Core/Shell Polymer | 148 | Less than 1 |
| 10 | Non Core/Shell Polymer plus Curable Gloss Reducing Acrylic Polymer | 33 | Less than 1 |
| 11 | Example 1 plus Curable Gloss Reducing Acrylic Polymer | 12 | 34 |

This table demonstrates that in order to obtain materials suitable for capstock applications where impact greater than 25 in-lbs per 40 mils of thickness is desired, a core/shell polymer must be present. The core/shell can be by itself or a thermoplastic can be present in addition to the core/shell.

What is claimed is:

1. A thermoplastic composition comprising:
   (a) a core/shell polymer wherein (i) the core comprises 45 to 99.9, parts by weight of units derived from at least one C1-C8 alkyl acrylate monomer, and from 0.1 to 5 parts by weight of units derived from at least one crosslinker, and (ii) the shell comprises 80 to 99 parts by weight of units derived from at least one C1-C8 alkyl methacrylate monomer, and 1 to 20 by weight of units derived from at least one ethylenically unsaturated copolymerizable monomer different from the at least one C1-C8 alkyl methacrylate monomer and wherein the shell has a Tg above 20° C.
   (b) at least 1% by weight of an acrylic polymer that contains 1-15%, by weight of the acrylic polymer, of one or more monomers selected from the group consisting of (mono, di, tri alkoxysilyl) alkyl (meth)acrylate, methylol acrylamide, methylol methacrylamide, methyl acrylamidoglycolate methyl ether and acrylamidoglycolic acid.

2. The thermoplastic composition of claim 1 wherein the core of the core/shell polymer comprises 80 to 99.5 parts by weight of units derived from at least one C1-C8 alkyl acrylate monomer; 0.5 to 2 parts by weight of units derived from at least one crosslinker, and the shell of the core/shell polymer comprises 85 to 97 by weight of units derived from at least one C1-C8 alkyl methacrylate monomer and 10 to 20 parts by weight of units derived from at least one ethylenically unsaturated copolymerizable monomer different from the at least one C1-C8 alkyl methacrylate monomer; and wherein the acrylic polymer comprises at least 5% by weight of an acrylic polymer that itself contains 1-15% by weight of one or more monomers selected from the group consisting of (mono, di, tri alkoxysilyl) alkyl (meth)acrylate, methylol acrylamide, methylol methacrylamide, methyl acrylamidoglycolate methyl ether and acrylamidoglycolic acid.

3. The thermoplastic composition of claim 2 wherein wherein the core of the core/shell polymer comprises 94 to 99.5 by weight of units derived from at least one C1-C8 alkyl acrylate monomer and 0.5 to 1.5 parts by weight of units derived from at least one crosslinker, and the shell of the core/shell polymer comprises 92 to 96 by weight of units derived from at least one C1-C8 alkyl methacrylate monomer and 10 to 20 parts by weight of units derived from at least one ethylenically unsaturated copolymerizable monomer different from the at least one C1-C8 alkyl methacrylate monomer.

4. A thermoplastic composition comprising:
(a) a core/shell polymer wherein (i) the core comprises 45 to 99.9, parts by weight of units derived from at least one C1-C8 alkyl acrylate monomer, and 0.1 to 5 parts by weight of units derived from at least one crosslinker, and (ii) the shell comprises 80 to 99 parts by weight of units derived from at least one C1-C8 alkyl methacrylate monomer, and 1 to 20 by weight of units derived from at least one ethylenically unsaturated copolymerizable monomer different from the at least one C1- C8 alkyl methacrylate monomer and wherein the shell has a Tg above 20° C.;
(b) at least 1% by weight of an acrylic polymer that itself contains 1-15% by weight of one or more monomers selected from the group consisting of acrylic acid, methacrylic acid, maleic acid, crotonic acid, itaconic acid, monomethyl itaconate, monomethyl fumarate, monobutyl fumarate, maleic anhydride, itaconic anhydride, dimethyl amino ethyl (meth)acrylic, dimethyl amino propylmethacrylamide, vinyl pyridine, t-butylaminoethyl methacrylate, hydroxyl propyl (meth)acrylate, hydroxyl ethyl (meth)acrylate, acetoacetoxyethyl (meth)acrylate, glycidyl (meth)acrylate, allyl glycidyl ether, vinyl isocyanate, and allyl isocyanate; and
(c) 0.1 to 10% by weight based on the weight of polymer (b) of a curing agent for b.

* * * * *